United States Patent [19]

Sander

[11] 4,092,679
[45] May 30, 1978

[54] APPARATUS FOR VARIABLY SELECTING THE CAPACITY OF A RECORDING MEDIUM IN A RECORDING SYSTEM

[75] Inventor: Willy M. Sander, Stamford, Conn.
[73] Assignee: Dictaphone Corporation, Rye, N.Y.
[21] Appl. No.: 722,141
[22] Filed: Sep. 10, 1976
[51] Int. Cl.² .................. G11B 15/68; G11B 19/06; G11B 23/04
[52] U.S. Cl. .................. 360/71; 179/100.1 DR; 360/72; 360/74; 360/92
[58] Field of Search .................. 360/71-72, 360/74, 61, 92, 137; 179/100.1 DR; 324/172-173

[56] References Cited

U.S. PATENT DOCUMENTS

| | | | |
|---|---|---|---|
| 3,467,790 | 9/1969 | Bolick, Jr. et al. | 360/71 |
| 3,575,658 | 4/1971 | Behr et al. | 360/71 |
| 3,708,633 | 1/1973 | Nye et al. | 360/74 |
| 3,821,802 | 6/1974 | Nye et al. | 360/71 |
| 3,823,274 | 7/1974 | Matz | 179/100.1 DR |
| 3,965,484 | 6/1976 | Matz et al. | 179/100.1 DR |
| 4,014,039 | 3/1977 | Yasunaga | 360/74 |
| 4,024,354 | 5/1977 | Bolick, Jr. et al. | 179/100.1 DR |

*Primary Examiner*—Alfred H. Eddleman
*Attorney, Agent, or Firm*—Arthur V. Smith

[57] ABSTRACT

Apparatus is provided for use in a recording system wherein messages are recorded on a recording medium of fixed length, to variably select the recording capacity of the medium. Signals, which are produced when messages are recorded, are counted to accumulate an indication of the amount of recording medium that has messages recorded thereon. In one embodiment, the signals that are counted are representative of incremental lengths of the recording medium so that the accumulated indication represents the total length of recorded messages. A comparator compares the accumulated indication a preselected capacity and, when the preselected capacity has been attained, a corresponding output signal is generated. This output signal may be used to produce a perceptible indication and, in a preferred embodiment, may be used to replace the recording medium with a fresh recording medium.

If this apparatus is used in a central dictation system having plural dictators, the preselected capacity of the recording medium may be represented as a length of medium, such as a percentage of the maximum length or capacity thereof, or as a selected number of individually established communications, or seizures, between the central unit and each dictator.

16 Claims, 4 Drawing Figures

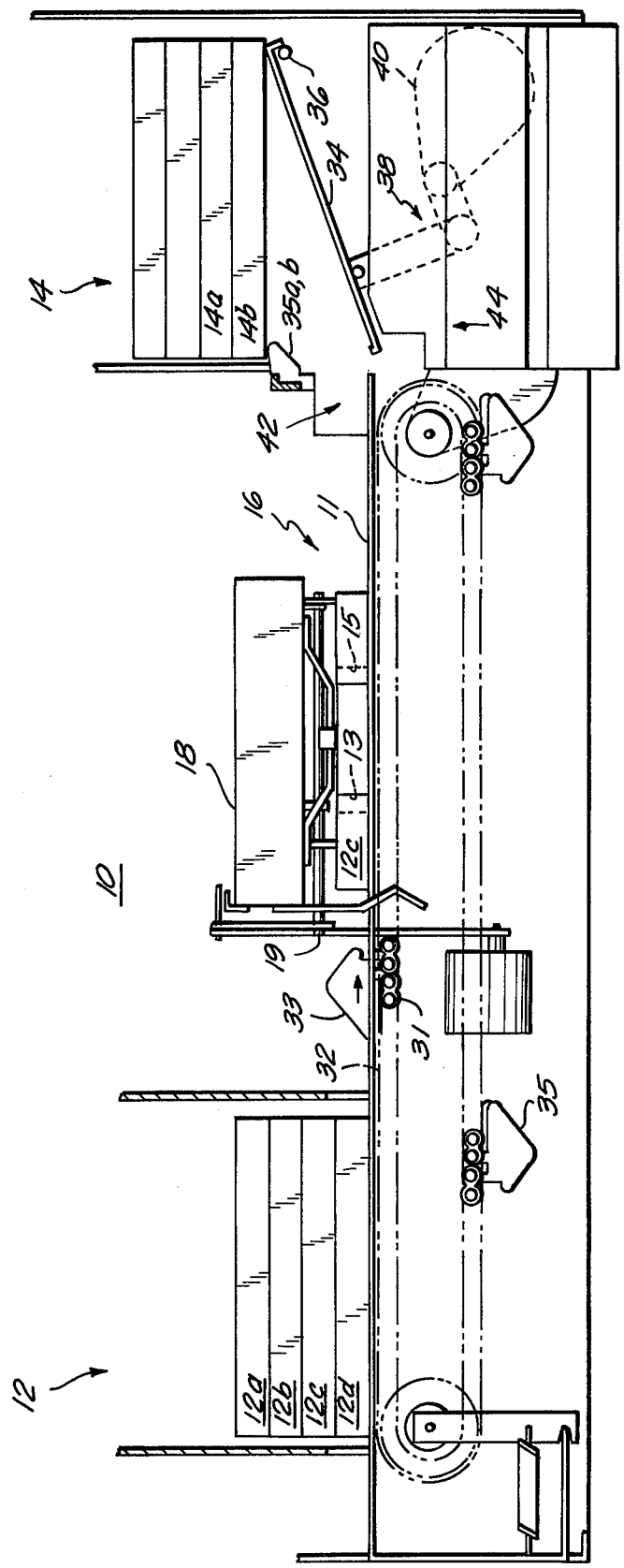

APPARATUS FOR VARIABLY SELECTING THE CAPACITY OF A RECORDING MEDIUM IN A RECORDING SYSTEM

BACKGROUND OF THE INVENTION

This invention relates to apparatus for indicating when a preselected capacity of a recording medium upon which messages are recorded in a recording system has been used and, more particularly, to such an apparatus wherein the preselected capacity is a variable percentage of the total capacity of the recording medium, and wherein the recording medium is replaced automatically with a fresh medium when such preselected capacity has been used.

In recording systems wherein messages such as audio information are recorded on a medium of finite length, or capacity, it often is advantageous to apprise an operator of that system when the capacity of the medium is or soon will be reached. This is particularly advantageous when the messages are dicated information, so that the operator is prepared to replace the recording medium with a fresh medium and thus continue dictation without loss of information and without serious interruption in the overall dictation operation.

When the recording system is of the so-called central-type of system, a central record/playback unit generally is adapted to communicate with an individual one of multiple remote dictate stations. If an operator at a remote dictate station establishes communication with or, "seizes" the central unit, whereat the recording medium has remaining only a small percentage of its total capacity for the recording of additional dictated messages, there is a strong possibility that the operator then communicating with the central unit will be unable to complete his message on such remaining portion of the medium. Hence, it is desirable to furnish that operator with an indication that only a small percentage of the recording capacity of the medium is available to him and, preferably, to avoid the occurrence of such a situation. When the recording medium is constituted by a recording belt, such as a permanent recording belt or a magnetic belt, or by a magnetic disc or by magnetic tape, the aforementioned situation can be substantially avoided by automatically replacing the recording medium with a fresh medium once a predetermined capacity of the medium has been attained and prior to the establishment of communication between a remote dictate station and the central unit. Thus, when only a small recording capacity remains, the recording medium, e.g., the belt, disc, or tape, will be replaced before the next seizure of the central unit, thereby assuring that the next operator will be furnished with a medium that is substantially capable of recording his entire message.

As may be appreciated, the expected length of a typical message may vary, depending upon the particular operator, the environment of the recording system and the general usage thereof. For example, when a typical dicated message is relatively brief, the recording medium of finite length can be expected to have multiple messages recorded thereon. Conversely, when the typical dictated message is relatively long, the recording medium will exhibit a capacity for relatively few messages. Therefore, it is desirable to permit an operator, or supervisor, of the recording system to select, or preset, the relative capacity of the medium. For example, if the medium has a 30-minute recording capacity, and if the typical dictated message is approximately 3 minutes, then the relative capacity of the medium may be selected at 20-24 minutes so as to reasonably insure that most of the medium will be used economically, but that it will not be exhausted while a dictation operation is in progress. Once this preselected amount of recording is achieved, the recording medium then can be replaced once the dictation operation then in progress has been completed. As another example, if it is of primary importance to prevent the exhaustion of the recording medium during a dictation operation, the preset capacity can be reduced to a relatively lower percentage of the full recording capacity.

As yet another example of establishing a preselected capacity of the recording medium, this preselection may be determined as a function of individual messages that are recorded. Then, assuming that the expected length of each message is known, the number of individually recorded messages can be counted until the preset number is reached. Typically, successive messages can be distinguished by providing a start-of-message signal, or equivalent, immediately prior to the actual message. In one embodiment of a central recording system, the equivalent of a start-of-message signal is produced whenever a remote station seizes the central unit.

It is believed that, in most instances, a more efficient use of the recording medium is achieved by establishing the preselected capacity thereof as a function of its length. Since the effective length of a recording medium usually is interpreted as the time-related quantity of messages that can be recorded, the preselected recording capacity can be established as a function of recording time. However, in order to achieve greater flexibility, it is advantageous to provide a dual measure of recording capacity, e.g., as a percentage of the total recording time of the medium or as a number of recorded messages, both effectively representing the amount of recording medium that can be used.

OBJECTS OF THE INVENTION

Therefore, it is an object of the present invention to provide apparatus for indicating when a preselected recording capacity of a recording medium has been consumed.

Another object of this invention is to provide apparatus for indicating when a preset length of a recording medium has been used to record messages or when a preset number of messages has been recorded.

A further object of this invention is to provide apparatus for use in a central recording system of the type having a recording unit adapted to be seized by and communicate with any one of plural remote stations, the apparatus being capable of indicating when a preset amount of messages has been recorded on a recording medium.

An additional object of this invention is to provide apparatus for use in a central dictation system of the type having a supply of individual recording media, each adapted to have messages recorded thereon, the apparatus operating to initiate an automatic medium replacing operation after a preset amount of messages has been recorded thereon.

Yet another object of this invention is to provide apparatus for indicating when a preselected recording capacity of a recording medium has been consumed, this indication being provided on the basis either of the amount of medium which has been used for recording or the number of messages that have been recorded.

A still further object of this invention is to provide apparatus for use in a recording system wherein an operator can selectively determine the amount of messages to be recorded on a recording medium, the apparatus being adapted to provide an indication when the selected amount has been attained.

Various other objects, advantages and features of the present invention will become readily apparent from the ensuing detailed description, and the novel features will be particularly pointed out in the appended claims.

SUMMARY OF THE INVENTION

In accordance with the present invention, apparatus is provided for use in a recording system of the type wherein messages are recorded on a recording medium of fixed length, the apparatus being adapted to provide an indication when a preselected capacity of the medium has been consumed, and including a selector for establishing a preselected recording capacity equal to or less than the total capacity of the recording medium; a signal generator for generating signals when messages are recorded on the medium; a counter for counting the generated signals so as to accumulate an indication of the amount of recording medium that has been used; a comparator coupled to the counter and to the selector for detecting when the amount of recording medium that has been used is substantially equal to the preset capacity; and a utilization device responsive to such detection to provide an indication that the preset capacity of the medium has been attained.

BRIEF DESCRIPTION OF THE DRAWINGS

The following detailed description, given by way of example, will best be understood in conjunction with the accompanying drawings in which:

FIG. 1 is a perspective view of a recording system wherein the present invention finds ready application;

DETAILED DESCRIPTION OF A PREFERRED EMBODIMENT

Figure 2A:
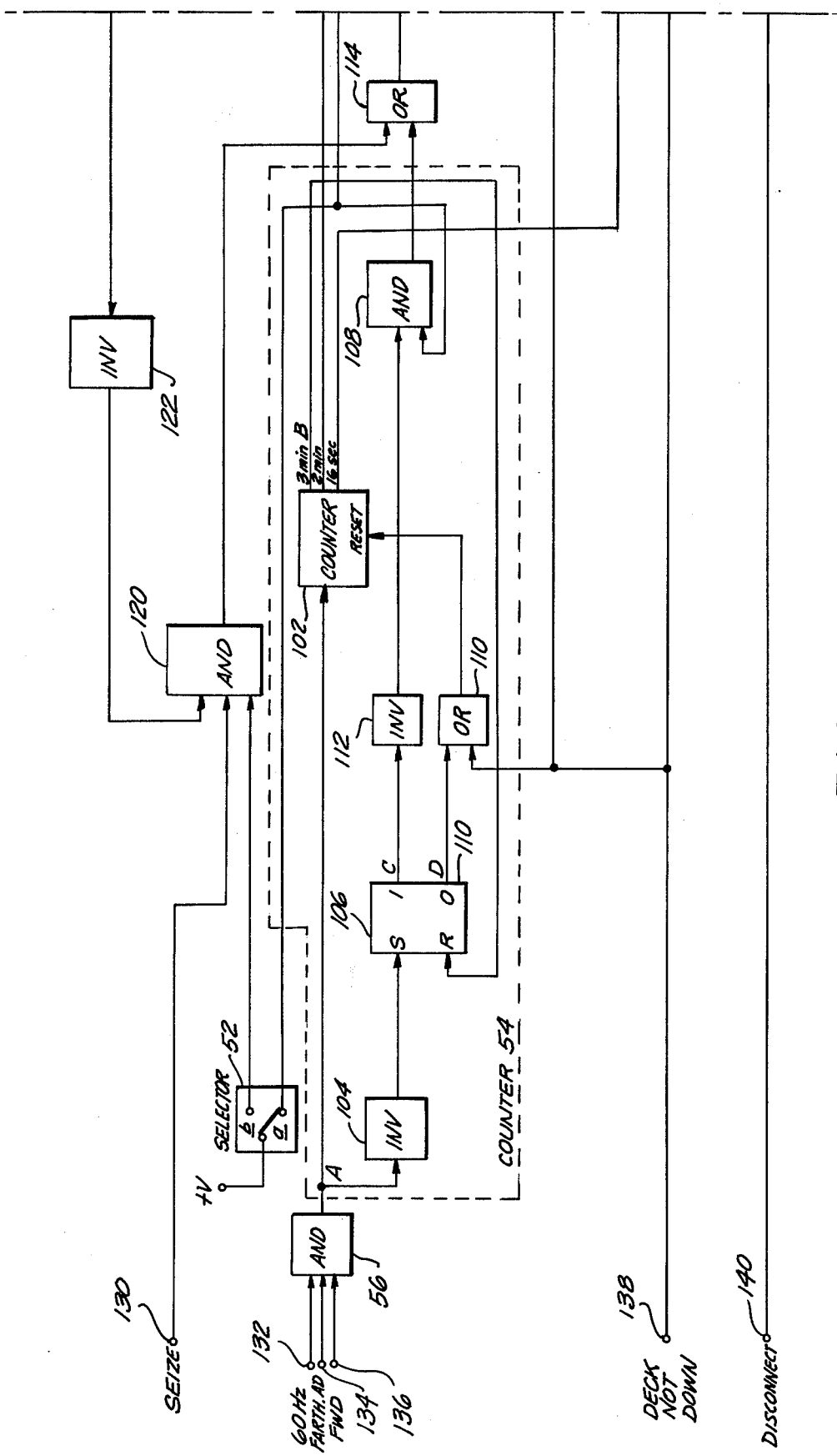
FIGS. 2A and 2B illustrate, in combination, electronic logic circuitry which can be used to carry out the present invention.

The present invention can be used advantageously to indicate when the amount of messages, such as audio information, recorded on a recording medium is equal to a preset amount. Typically, the recording medium may be constituted by magnetic tape, a magnetic disc, a magnetic belt, or a permanent belt record. Such media are well known in the art and are used in various types of recording devices, such as dictation apparatus. In order to simplify the following discussion, it will be assumed that the recording medium is magnetic tape of the type contined in a housing, such as a conventional tape cassette. Furthermore, the recording system with which this tape cassette is used will be described as a central dictation system of the type having a central record/playback unit adapted to be seized by and communicate with any individual one of plural remote dictate stations. Nevertheless, it should be appreciated that reference in the following description to magnetic tape and tape cassettes shall be construed as referring to the aforenoted general types of recording media, and description of a particular type of central dictation system shall be interpreted as applying to other types of recording devices.

Referring now to FIG. 1, there is generally illustrated a record/playback unit 10 which can be used in a central dictation system. The central dictation system is of the type having electrical connections (not shown) to individual ones of a multiple of remote dictate stations, each such remote station having suitable controls to enable an operator to initiate a dictate operation and to review his previously dictated information, or messages. As is conventional in such central dictation systems, control electronics are provided to insure that only a single remote station can gain access to, or seize, the central record/playback unit, and to prevent such seizures by other remote stations when communication between the central unit and one station is in progress.

Record/playback unit 10 is adapted to record messages dictated from the remote dictate stations onto tape housed within a conventional cassette structure. It is appreciated that the tape in each cassette is of a fixed length and, therefore, each cassette has a finite recording capacity determined by the length of tape and tape transport speed. Record/playback unit 10 is provided with an input stack 12 which, for example, may comprise a magazine to support a stack of individual cassettes 12a . . . 12d. Also provided is an output stack 14 which also may comprise a magazine adapted to support individual cassettes 14a, 14b which have been used for the recording of dictated messages and are awaiting subsequent transcription. A platform 11 extends between input stack 12 and output stack 14 and is adapted to support a cassette 12e that is removed from input stack 12 and conveyed to a recording station 16. Platform 11 is provided with a channel 32 within which rides a drive chain 31, the chain being driven by a suitable drive motor (not shown). Plural wedge-shaped flights are mechanically secured to chain 31 and are spaced along the length of chain. Two of such flights 33, 35 are shown, and each is adapted to contact the bottom-most cassette in input stack 12, to push that cassette to recording station 16 and thence to output stack 14. Suitable sensing devices, such as sensing switches (not shown) are provided for sensing the relative position of the flights so as to control the overall operation of record/playback unit 10. Such control is described in greater detail in copending application Ser. No. 722,162, filed Sept. 10, 1976, and assigned to the assignee of the instant invention.

A record/playback deck 18 is provided at recording station 16 and, in the illustrated embodiment, includes reel drive spindles 20 and 22, a record/playback head 24, a capstan 26, a pinch roller 28 and an erase head 30, as is conventional. These elements are provided in an integral unit forming deck 18. In the illustrated embodiment, deck 18 is pivoted about a suitable pivot support 19 such that the operable components of the deck can engage corresponding elements in cassette 12e at recording station 16. Preferably, deck 18 is of the type whose construction is disclosed in greater detail in copending applications Ser. Nos. 678,596, now U.S. Pat. No. 4,056,835, and 678,704, now U.S. Pat. No. 4,061,292 both filed Apr. 20, 1976 and both assigned to the assignee of the present invention. As is appreciated, cassette 12e is conventional and includes reel drive apertures 13 and 15 in the top and bottom walls of the cassette, capstan-receiving apertures in these walls and additional apertures in the front wall to receive various heads and a pinch roller.

Output stack 14 is adapted to store recorded cassettes 14a, 14b in the so-called first-in, first-out configuration. That is, the cassette that had been used first appears on the top of output stack 14 and the cassette that had been used last appears on the bottom of this stack. Accordingly, an elevator assembly is adapted to receive a recorded cassette, such as cassette 12e, ejected from recording station 16 and conveyed to the elevator assembly by, for example, flight 33. In one embodiment, the elevator assembly comprises a receiving platform 34 pivoted at 36 to the output stack magazine. A motor 40 mechanically linked through linkage 38 to platform 34 is adapted to raise and lower this platform so as to correspondingly add an ejected cassette to the bottom of output stack 14. Preferably, the pivot connection at 36 is disposed in a plane above the plane of conveying platform 11. Hence, in its cassette-receiving position, platform 34 is angled downwardly from this higher pivot plane to platform 11. When cassette 12e is loaded onto elevator platform 34, motor 40 is operated to pivot platform 34 upwardly and thus introduce cassette 12e into stack 14.

A spring-biased member having, for example, two projections 35a and 35b that extend from side walls of the output stack magazine is adapted to support the cassettes in this output stack. As shown, projections 35a, 35b have cammed surfaces so as to permit the member to pivot out of interference with an ejected cassette that is inserted into the output stack.

In operation, a cassette, such as cassette 12e, initially is withdrawn from input stack 12 and is conveyed by flight 33 to recording station 16. When the cassette is positioned properly at the recording station, deck 18 pivots into operative relation with the cassette. Thus, reel drive spindles 20 and 22 are inserted into corresponding apertures 13 and 15, capstan 16 is inserted into a capstan-receiving aperture and heads 24 and 30 and pinch roller 28 are insertable through respective apertures to engage the tape within cassette 12e. At this time, elevator platform 34 is disposed in its lower, or cassette-receiving position. When record/playback unit 10 is seized by a remote dictate station, a dictation operation is performed and a suitable message is recorded on the tape. For the purpose of the present description, a "message" means one or more segments or portions of information which are dictated by an operator at a particular remote station.

At the completion of a dictation operation, that is, at the end of a message, communication between record/playback unit 10 and the remote station is terminated. Hence, record/playback unit 10 now is adapted to be seized by another remote station. After a preselected capacity of the tape (i.e., recording time) in cassette 12e consumed by messages, the cassette is conditioned to be ejected from recording station 16. The apparatus for selecting this capacity and for detecting when it has been attained will be described in greater detail hereinbelow in respect to FIGS. 2A and 2B. Now, when communication between record/playback unit 10 and the remote station terminates, deck 18 is pivoted away from cassette 12e and flight 33 conveys the cassette onto elevator platform 34. Concurrently, the next flight 35 contacts bottom-most cassette 12d to convey this cassette from the bottom of input stack 12 to recording station 16.

Once cassette 12d is properly positioned at the recording station, deck 18 is pivoted into operative relation therewith, thus conditioning record/playback unit 10 for another dictate operation, and simultaneously, motor 40 is energized to pivot platform 34 and thus drive cassette 12e (which had been loaded thereon) upwardly for addition to the bottom of output stack 14. Platform 34 then is returned to its cassette-receiving position for subsequent re-use. When the preset capacity of cassette 12d is attained, this cassette is ejected and conveyed to output stack 14 in the manner described hereinabove. Hence, except for brief cassette-loading intervals, successive messages from various remote stations can be recorded substantially continuously on successive tape cassettes provided that the supply of cassettes in input stack 12 is replenished.

Although forming no part of the present invention per se, record/playback unit 10 is provided with a "special" or "priority" cassette eject feature. Since elevator platform 34 is pivoted at 36 in a plane above the plane of the platform 11, it is appreciated that if the elevator platform is raised, an ejected cassette merely will pass beneath it. Accordingly, the priority cassette eject feature includes an output slot 42 provided in the output stack magazine and a chute 44. When a particular cassette is designated as a priority cassette, it is conveyed from recording station 16, notwithstanding that the preselected recording capacity of this cassette has not been attained, in response to suitable control signals. Prior to ejecting this "priority" cassette, elevator platform 34 is raised. Hence, the priority cassette is conveyed beneath the output stack and slides through slot 42 and down guide chute 44, for example, to be transcribed immediately. Elevator platform 34 than may return to its normal cassette-receiving position.

Although the foregoing has described the general structure and operation of the illustrated record/playback unit 10, a more detailed description of a preferred embodiment thereof is set forth in copending applications Ser. Nos. 722,162 and 722,144, filed Sept. 10, 1976, and both assigned to the assignee of the instant invention.

Figure 2B:
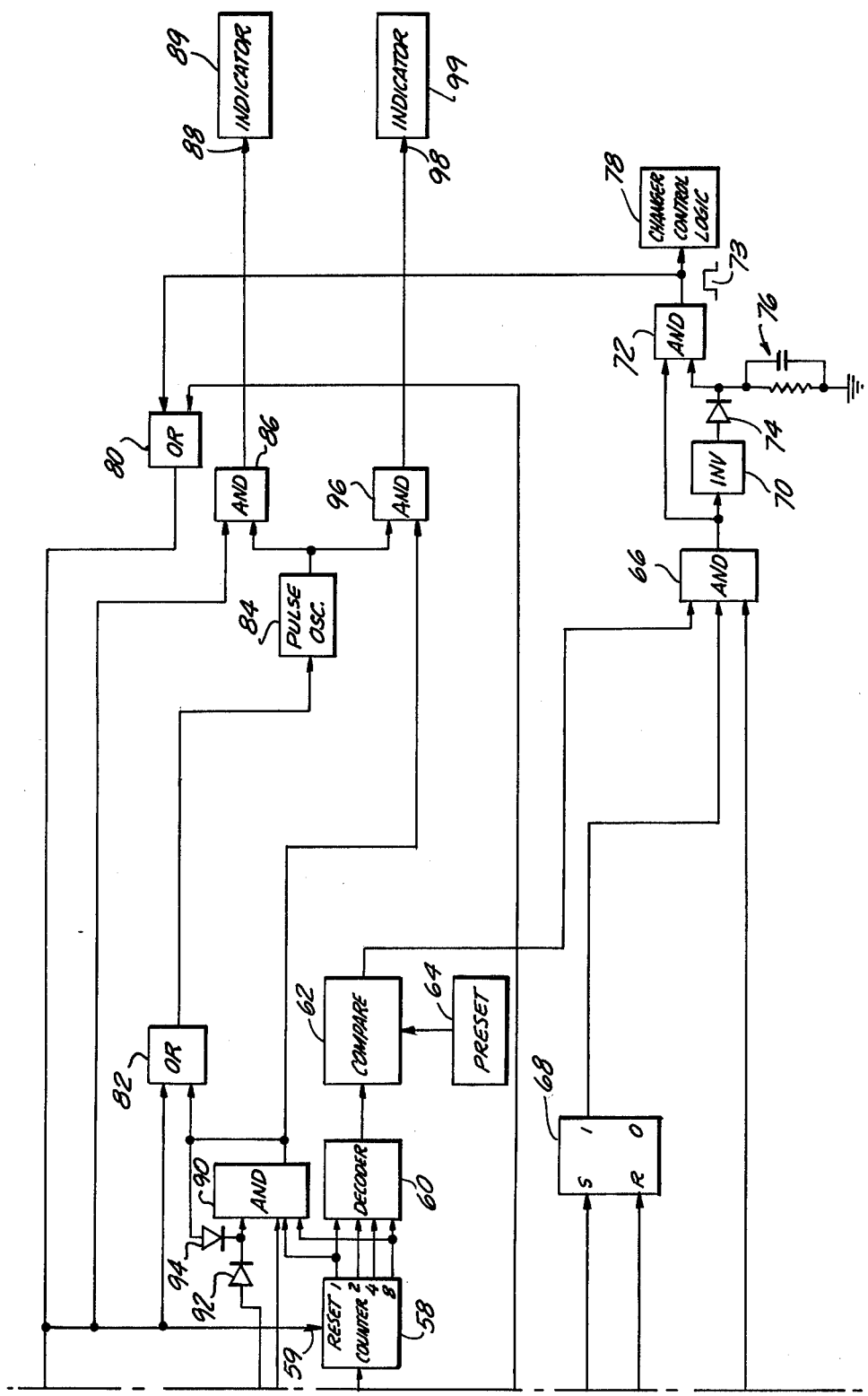

Turning now to FIGS. 2A and 2B, there is illustrated a preferred embodiment of apparatus which may be used to detact when the preselected recording capacity of a tape cassette has been reached, thereby initiating a cassette replacement operation of the type discussed hereinabove in respect to FIG. 1. The apparatus is capable of detecting the preselected capacity as a function of the total length of messages recorded on a cassette or as a function of the number of messages that have been recorded. Accordingly, a selector switch 52 is provided having a contact $a$ adapted to receive an energizing potential $+V$ when recording capacity is determined as a function of message length, and a terminal $b$ is adapted to receive the energizing potential $+V$ when capacity is determined as a function of the number of recorded messages. Hence, selector switch 52 may comprise a conventional change-over switch having mutually exclusive output signals provided at its output terminals $a$ and $b$, respectively. If desired, when the energizing potential $+V$ is provided at one output terminal, the other output terminal may be provided with a reference potential, such as ground. Output terminal $a$ of selector switch 52 is coupled to a counter 54 to condition that counter so as to operatively respond to clock signals applied thereto. In this regard, suitable clock signals representing, for example, real time, are applied to counter 54 from an input terminal 132 via an AND gate 56. The signals applied to input terminal 132 are derived from a suitable clock reference source, such as the synchronized power frequency used in the power supply grid of the United States, or in the power supply grid of other countries, or, as a further alternative, such signals may be derived from a synchronized oscillator. For the purpose of the present discussion, it may be assumed that the clock signals applied to input terminal 132 are 60Hz pulses derived from the so-called power "line" frequency.

AND gate 56 includes additional inputs coupled to input terminals 134 and 136, these input terminals being adapted to receive signals indicating that the tape in a cassette is being moved in the forward direction, as during a recording mode. As an example, input terminal 134 is adapted to be provided with a farthest advance signal representing that previously unrecorded tape is in position to be advanced for recording, and input terminal 136 is adapted to receive a FWD signal representing that tape is moving past record/playback head 24 in the forward direction. The manner in which the farthest advance signal is produced is described in greater detail in copending application Ser. No. 722,142, filed Sept. 10, 1976, and assigned to the assignee of the instant invention.

Counter 54, described in greater detail below, is adapted to produce output signals corresponding to various message lengths. Preferably, the counter is recyclable and produces a first output count signal when tape has been advanced to record a message of minimum duration, such as 16 seconds, a second output count signal when tape has been advanced for a longer time period, such as 2 minutes, and a third output count signal when tape has been advanced for a still longer time interval, such as 3 minutes. As will be described below, counter 54 preferably is a 3-minute counter and, therefore, is reset to an initial condition after every 3-minute message length. Stated otherwise, when a length of tape corresponding to a 16 second time interval has been advanced, a first count signal is produced; when the tape is further advanced by a length corresponding to a 2-minute message a second count signal is produced; and when a length of tape corresponding to a 3-minute message is advanced, a third count signal is produced.

Counter 54 is coupled to a second counter 58 by an OR circuit 114 so as to supply the third, or 3-minute, signals to counter 58. Counter 58 may comprise a conventional binary counter, such as a four-stage counter, capable of producing a binary-coded signal representing the number of 3-minute signals that have been counted. Accordingly, a 4-bit binary notation representing, for example, a count of 0, 1, ... 15, respectively, is produced. This 4-bit count is supplied in parallel to a decoder 60. The decoder may comprise a conventional binary-to-decimal converter and may be further connected to a numerical display (not shown) to provide an indication of the total length of messages that have been recorded on the tape. As shown, decoder 60 is coupled to a comparator 62 to which the output of a preset selector circuit 64 also is connected.

Comparator 62 is conventional and is adapted to compare the actual count exhibited by the counter 58 to a predetermined count supplied from preset selector circuit 64. In one embodiment thereof, preset selector circuit 64 is comprised of a dual-mode selection switch operable to permit an operator to establish a preselected capacity of messages that are to be recorded on a tape cassette. In one mode, this capacity is expressed in terms of tape length, or message length, such as a percentage of the total amount of available tape. For example, if a cassette containing a 30-minute tape is used, the preselected tape capacity can be adjustably established within the range of 0 to 30 minutes, preferably in 3-minute increments. Consequently, preset selector circuit 64 is adapted to supply a reference signal to comparator 62 corresponding to, for example, 0 minutes, 3 minutes, 6 minutes, ... 27 minutes or 30 minutes of tape, or messages. Of course, if the total capacity of the recording medium with which the present invention is used is other than 30 minutes, preset selector circuit 64 may be adjusted to supply a corresponding reference signal to comparator 62, depending upon the desired preselected capacity of the medium. In the second mode of operation, preset selector circuit 64 is adapted to supply a reference signal to comparator 62 representing the desired number of individual messages which may be recorded on the recording medium.

Comparator 62 is adapted to generate an output signal when the count exhibited by counter 58, and decoded by decoder 60, is at least equal to the reference signal applied by preset selector circuit 64. This output signal is applied to a utilization circuit for deriving an indication that the preselected capacity of the medium has been attained. The utilization circuit also is adapted to initiate a cassette replacement operation whereby cassette 12e, shown in FIG. 1, is ejected and conveyed to output stack 14 and a fresh cassette 12d is withdrawn from input stack 12 and is conveyed to recording station 16. To this effect, the utilization circuit includes an AND gate 66 having an input coupled to comparator 62 and an output connected to one input of AND gate 72 so as to produce an output pulse shown at 73. This output pulse 73 is produced by connecting the output of AND gate 66 to another input of AND gate 62 via an inverter 70 and a pulse generator formed of a diode 74 connected to a parallel RC circuit 76.

It is recalled that the purpose of establishing a preselected recording capacity of the recording medium which is less than the total recording capacity is to permit efficient utilization of the medium. That is, it is expected that the last message to be recorded on the medium will exceed the preselected capacity but will be less than the total recording capacity. This will permit the last message to be recorded substantially in its entirety. Of course, once this last message is recorded, although a portion of the recording medium may be unused, this medium should be replaced with a fresh recording medium. Hence, it is a preferred feature of the present invention to initiate a replacement operation subsequent to the completion of the last recorded message, and not during the recording of that message. For the purpose of the present discussion, it should be apparent that the expression "last recorded message" means the message that is being recorded and that results in a consumption of the recording medium that exceeds the preselected capacity thereof.

To implement the foregoing preferred feature, AND gate 66 is provided with a second input connected to an input terminal 140 and adapted to receive a signal when communication between a remote dictate station and the record/playback unit is terminated. Also, to avoid the premature ejection of a cassette from the recording station in the event that preset selector circuit 64 inadvertently is set to establish a capacity of 0 minutes (or 0 messages), AND gate 66 includes a third input connected to a flip-flop circuit 68. Flip-flop circuit 68 may comprise a conventional bi-stable multivibrator having a first, or set, state, for applying a conditioning signal, hereinafter a binary "1", to AND gate 66, and a second, or reset, state, for disabling AND gate 66 by supplying a binary "0" thereto. As is conventional, the particular state of flip-flop circuit 68 is determined by signals applied to respective set and reset inputs. As shown, the set input of flip-flop circuit 68 is coupled to counter 54 and is adapted to receive the aforementioned first, or 16-second, count signal produced by that counter. The reset input of flip-flop circuit 68 is connected to an input terminal 138 and is adapted to receive a signal whenever recording deck 18, shown in FIG. 1, is not in its operative position. That is, flip-flop circuit 68 is reset whenever deck 18 is not "down" to operatively engage a cassette, such as cassette 12e. Accordingly, it may be appreciated that flip-flop circuit 68 does not assume its set state until a minimum amount of tape, e.g., a length corresponding to 16 seconds, is advanced in cassette 12e. Thus, the combination of flip-flop circuit 68 and AND gate 66 is adapted to substantially insure that a recording medium, that is, a tape cassette, is not replaced with a fresh recording medium until a message of minimum length is recorded. Hence, even if preset selector circuit 64 is preset inadvertently to a 0 capacity, record/playback unit 10 of FIG. 1 is substantially prevented merely from cycling through an entire input stack of cassettes without having any messages recorded thereon. If desired, an alternative count signal may be applied from counter 54 to set flip-flop circuit 68 in accordance with any other desired minimum amount of message length.

AND gate 72, which is adapted to produce output pulse 73 of predetermined duration, is connected to changer control logic 78 and, additionally, through OR circuits 80 and 82 to a pulse oscillator 84. Changer control logic 78 is adapted to respond to pulse 73 so as to initiate a cassette replacement operation whereby, as shown in FIG. 1, cassette 12e is ejected from recording station 16 and is conveyed to output stack 14, and a fresh cassette 12d is withdrawn from input stack 12 and conveyed to the recording station for the subsequent recording of messages thereon. Changer control logic 78 is described in greater detail in copending application Ser. No. 722,162, as mentioned above.

Pulse oscillator 84 may comprise a conventional actuable free-running pulse generator that is responsive to a signal, such as a binary "1", to initiate an oscillation. The output of pulse oscillator 84 is adapted to be transmitted through an AND gate 86 to an output terminal 88. AND gate 86 is conditioned by output pulse 73 supplied thereto via OR circuit 80. Since OR circuit 80 also is responsive to a signal applied to input terminal 138 in the event that deck 18 is not "down" in operative relation with a cassette (FIG. 1), AND gate 86 alternately is conditioned to transmit the output of pulse oscillator 84 when a cassette replacement operation is being performed. Hence, the pulses produced by pulse oscillator 84 and appearing at output terminal 88 may be used to provide a suitable indication, such as by indicator 89, of the performance of a cassette replacement operation that has been initiated when the preselected recording capacity, as established by preset selector circuit 64, is attained. If desired, indicator 89 may provide a perceptible indication, such as a visible indication, an audible indication, or the like. Hence, indicator 89 may comprise a flashing lamp or other light source, or the indicator may comprise an audible alarm, such as a buzzer, bell, etc.

Pulse 73 produced by AND gate 72 (as well as the signal applied to input terminal 138) additionally is applied through OR circuit 80 to a reset input 59 of counter 58. Hence, counter 58 is adapted to be reset to an initial count, whereby it is prepared for re-use when messages next are recorded on a fresh recording medium.

It may be appreciated that while a message is being recorded, the total amount of recorded messages on the recording medium may exceed the preselected recording capacity; but that communication between the remote dictate station and record/playback unit 10 continues. In that event, it is desired to provide another indication when the recording medium nearly is exhausted. If desired, this additional indication may be a perceptible indication returned to the operator at the remote dictate station to apprise him of the impending exhaustion of recording medium. One embodiment of apparatus capable of providing such an indication is illustrated as comprising AND gate 90, AND gate 96 and a suitable indicator 99. As a numerical example of impending exhaustion of recording medium, it will be assumed that record/playback unit 10 is operable with a tape cassette having a total recording capacity of 30 minutes. It will be further assumed that when messages totalling 29 minutes are recorded on the tape, then indicator 99 is actuated. Accordingly, AND gate 90 includes an input adapted to receive the aforementioned second, or 2-minute, count signal produced by counter 54. This signal is applied to AND gate 90 by a diode 92. Additional inputs of AND gate 90 are coupled to counter 58 so as to receive signals, i.e., a binary "1", when counter 58 attains a count of 9. It is recalled that in one operational mode, counter 58 receives timing pulses from counter 54, each timing pulse representing a 3-minute message interval. Hence, when counter 58 attains a count of 9, corresponding to 27 minutes of message recording, and counter 54 produces a signal representing an additional 2 minutes of message recording, then AND gate 90 is adapted to produce an output signal representing that the total message length recorded on the tape cassette is equal to 29 minutes. For a purpose soon to become apparent, an additional input of AND gate 90 is connected to terminal a of selector switch 52 such that this AND gate is conditioned to detect when the total length of messages recorded on the recording medium exceeds 29 minutes when selector switch 52 is operated to provide a measurement of recording capacity in terms of time.

The output of AND gate 90 is fed back to another input thereof via diode 94. Hence, it is appreciated that diodes 92 and 94 function as an OR circuit so as to "latch" AND gate 90 when a total message length of 29 minutes is detected. The output of AND gate 90 is adapted to actuate pulse oscillator 84 via OR circuit 82 and, additionally, to condition AND gate 96 so as to transmit the oscillations produced by oscillator 84 to indicator 99 connected to output terminal 98. Indicator 99 may be similar to indicator 89 and is adapted to provide a perceptible indication that the total recording capacity of the recording medium is nearly exhausted. In one embodiment, this indication is returned as a warning signal to the operator at the remote dictate station.

A preferred embodiment of counter 54 now will be described. This counter is comprised of a binary counter 102 having an input connected to AND gate 56 and adapted to count the successive 60Hz pulses applied thereto. As shown, binary counter 102 includes respective counter outputs from which the 16-second, 2-minute and 3-minute signals are derived. Accordingly, binary counter 102 is seen to be conventional. The 3-minute signal produced by binary counter 102 is applied to the reset input of a flip-flop circuit 106. As shown, the set input of this flip-flop circuit is adapted to be supplied with the clock pulses transmitted by AND gate 56 via an inverter 104. Hence, if these clock pulses are assumed to be positive impulses, inverter 104 applies a binary "1" periodically interrupted by negative impulses to the set input of flip-flop circuit 106.

In one example of counter 54, the 1 output of flip-flop circuit 106 is applied through an inverter 112 to an AND gate 108, the latter being conditioned by energizing potential +V applied thereto from terminal $a$ of selector switch 52. In this example, the O output of flip-flop circuit 106 is applied through an OR circuit 110 to a forced reset input of binary counter 102. Also, the signal supplied to input terminal 138 when deck 18 is not "down" in its operative position is supplied through OR circuit 110 to reset binary counter 102. In another example of counter 54, the 1 output of flip-flop circuit 106 is not used, and the 0 output of this flip-flop circuit is applied to AND gate 108.

Figure 3:
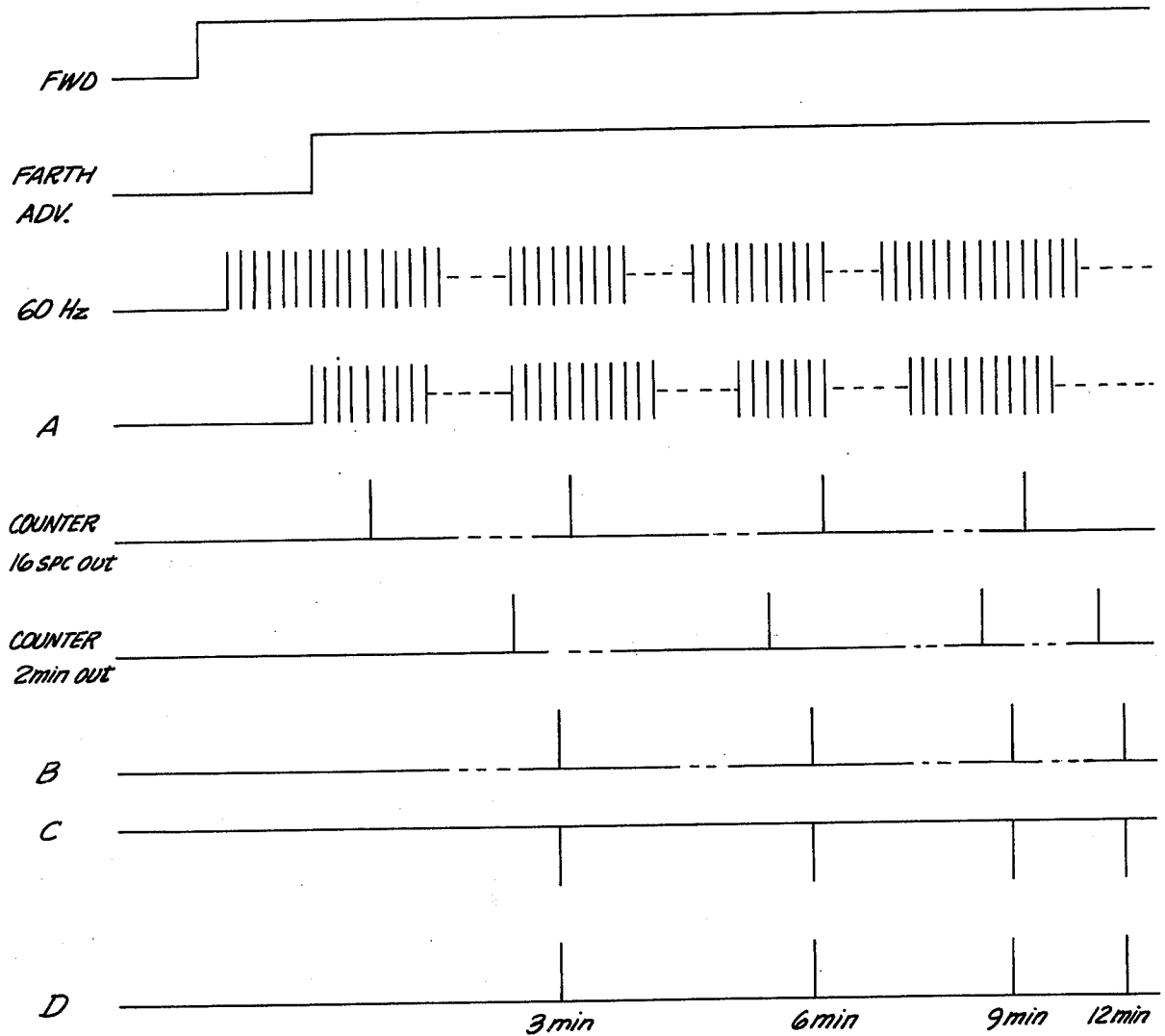
FIG. 3 is a waveform diagram depicting various signals produced by particular circuits shown in FIGS. 2A and 2B.

The manner in which counter 54 operates to apply timing pulses to counter 58 now will be described in respect to the waveform diagrams appearing at various components, these diagrams being shown in FIG. 3. Let it be assumed that the FWD and farthest advance signals appear as shown in FIG. 3. Such waveforms are produced typically after an operator has reviewed a portion of his dictated message and, after reaching his previously attained farthest advance position, resumes a recording operation. Then, if the 60Hz clock pulses appear as shown in FIG. 3, AND gate 56 produces an output A. These clock pulses shown in waveform A are applied to binary counter 102 and, after being inverted by inverter 104, are applied to the set input of flip-flop circuit 106. Let it be assumed that binary counter 102 exhibits an initial, or preset, count, such as zero, and that flip-flop circuit 106 initially is in its reset state. Hence, the pulses produced by AND gate 56 are counted by binary counter 102 and, additionally, serve to set flip-flop circuit 106. Accordingly, a binary "1" is applied to inverter 112 which, in turn, applies a binary "0" to inhibit AND gate 108.

As message recording continues, the 16-second count pulse is produced, followed subsequently by the 2-minute count pulse and then the 3-minute count pulse. Since clock pulses are applied to binary counter 102 only when tape actually is being transported for recording, it is appreciated that the respective count pulses are directly related to the length of a recorded message and, thus, to the amount of tape which has been consumed by the recorded message. The respective count pulses are shown in FIG. 3, and the 3-minute pulse is represented as waveform B. This signal B resets flip-flop circuit 106 to produce the respective pulses shown at waveforms C and D in FIG. 3. It is appreciated that waveform B is produced to reset flip-flop circuit 106 in concurrence with a clock pulse A. Hence, immediately after this flip-flop circuit is reset, the clock pulse terminates and flip-flop circuit 106 now is returned to its set state, as shown in waveforms C and D. Waveform C is inverted to provide relatively positive pulses through AND gate 108 and OR circuit 104 to counter 58. Also, pulses D are applied through OR circuit 110 to reset binary counter 102. Hence, binary counter 102 has a 3-minute count cycle, and the 3-minute timing pulses C are transmitted through AND gate 108 to be counted by counter 58.

It is recalled that selector switch 52 permits a dual mode of recording capacity detection. As just described, when energizing potential +V is applied to terminal $a$, recording capacity is measured and detected in terms of message length. Alternatively, when energizing potential +V is applied to terminal $b$, recording capacity is measured and detected in terms of the number of messages that are recorded on the recording medium. Thus, when in the latter mode, AND gate 108 is de-energized, or inhibited, and AND gate 120 is conditioned. Thus, although counter 54 may continue to operate in the manner described hereinabove, timing pulses C are not transmitted through AND gate 108.

In a preferred embodiment of a central dictation system wherein the present invention can be used, a "seizure" signal is produced when a remote dictate station gains access to, and is permitted to communicate with, record/playback unit 10. This seizure signal is applied as a binary "1" to an input terminal 130 and is supplied to a corresponding input of AND gate 120. Thus, AND gate 120 is adapted to produce an equivalent timing pulse whenever a seizure signal is applied to terminal 130. This timing pulse is supplied to counter 58 through OR circuit 114 so as to be counted in the same manner as the previously described timing pulses. When the number of seizure signals corresponds to the preset number, as represented by the reference signal applied to comparator 62 by preset selector circuit 64, an output pulse 73 is produced by AND gate 72 in the manner described hereinabove. This pulse 73 is used to initiate a cassette replacement operation and, in addition, is supplied through OR circuit 80 to an inverter 122, thereby inhibiting AND gate 120 from responding to further signals that may be applied to input terminal 130 until after this cassette replacement operation is completed.

The operation of the apparatus illustrated in FIGS. 2A and 2B now will be briefly described. Let it be assumed that selector switch 62 is operated such that recording capacity is measured and detected in terms of time, i.e., in terms of message length. As a numerical example, let it be further assumed that preset selector circuit 64 is operated to establish a capacity of, for example, 21 minutes. Accordingly, in this mode of operation, AND gate 108 is conditioned to transmit 3-minute timing pulses C to counter 58 and AND gate 120 is inhibited from responding to successive seizure signals applied to input terminal 130.

Let it be assumed that the effective length of a message recorded by an operator at a first remote station is equal to 4 minutes exclusive of pauses, rewinding of tape and reviewing at least portions of the recorded message. Hence, although the total time that this remote station is in operative communication with record/playback unit 10 may be much greater than 4 minutes, nevertheless, only 4 minutes of message information is transmitted during the time that this remote station is in communication with the record/playback unit.

When communication between this remote station and record/playback unit 10 terminates, the count then stored in counter 58 represents a message length of 3 minutes and the count then stored in counter 54 represents a message length of an additional 1 minute. Hence, comparator 62 does not produce an output signal upon termination of communication and, moreover, the illustrated apparatus is prepared to count subsequent clock pulses. Thus, when another remote station seizes record/playback unit 10 to initiate a message recording operation, counters 54 and 58 continue to count the clock pulses transmitted by AND gate 56. If the operator at this remote station transmits a message having an effective length of, for example, 8 minutes, counter 58 is suitably incremented to exhibit a count representing a total message length of 12 minutes. That is, at the time that this remote station is disconnected from record/playback unit 10, the total amount of tape then having messages recorded thereon is equivalent to 12 minutes.

The foregoing operation continues as messages are recorded on the tape from successive remote stations. As long as the count exhibited by counter 58 is less than a message length of 21 minutes, further messages may be recorded on, for example, cassette 12e. Let it now be assumed that, during communication between a remote station and the record/playback unit, the total length of messages then recorded on cassette 12e is equal to 21 minutes. Consequently, comparator 62 indicates that the count of counter 58 is equal to the reference signal applied by preset selector circuit 64. Accordingly, an output signal is applied to AND gate 66 by the comparator. Now, when the remote station then in communication with record/playback unit 10 is disconnected, each input of AND gate 66 is provided with a binary "1" such that a corresponding binary "1" is applied to an input of AND gate 72. Also, the binary "1" which previously had been applied by inverter 70 to charge the capacitor included in RC circuit 76 now is a binary "0". Hence, the capacitor is permitted to discharge through its parallel resistor. Depending upon the RC time constant of this circuit, a binary "1" is provided at each input of AND gate 72 until the capacitor is sufficiently discharged. Thus, pulse 73 is produced and is applied by AND gate 72 to changer control logic 78 to initiate a cassette replacement operation as described above.

Additionally, pulse 73 is applied through OR circuit 80 to reset input 59 of counter 58 and, also, through OR circuit 82 to actuate pulse oscillator 84 and to condition AND gate 86 to transmit the pulse oscillations to a suitable indicator 89. Therefore, when the preselected recording capacity is attained, the cassette is replaced with a fresh cassette once the remote dictate station is disconnected from record/playback unit 10, and a suitable perceptible indication is provided by indicator 89, representing that this replacement operation is being performed because the preselected capacity has been reached.

When a cassette replacement operation is performed, recording deck 18 is pivoted away from cassette 12e, shown in FIG. 1. Since deck 18 now is not "down" in operative relation with cassette 12e, a suitable signal is applied to input terminal 138 to reset binary counter 102 via OR circuit 110 and to reset flip-flop circuit 68. Furthermore, in the event that output pulse 73 is not fully successful in resetting counter 58, or in the event that some spurious pulse alters the reset state of counter 58, the signal applied to input terminal 138 is further supplied through OR circuit 80 to reset input 59 of counter 58 to insure that this counter is properly reset. Also, this signal at input terminal 138 maintains the actuation of pulse oscillator 84 through OR circuits 80 and 82, and conditions AND gate 86 so that indicator 89 continues the aforementioned indication substantially for the time required to complete the cassette replacement operation. Accordingly, the illustrated apparatus now is prepared for a subsequent capacity measuring and detecting operation. If desired, prior to or after commencing this measuring and detecting operation, preset selector circuit 64 may be operated to establish a different preselected capacity. As described above, messages will be recorded on the recording medium until the total length of such recorded messages is equal to the preselected recording capacity. Then, although message recording can continue, following a disconnection between the remote station and record/playback unit 10, the recording medium will be replaced and the illustrated apparatus will be restored to an initial condition and prepared for re-use.

In accordance with the numerical example assumed above, let it be further assumed that an operator continues to dictate a message even after the preselected recording capacity has been reached. If dictation continues until counters 54 and 58 represent, for example, an actual message length of 29 minutes, then AND gate 90 is energized to actuate pulse oscillator 84 and condition AND gate 96 to transmit pulse oscillations to indicator 99. Hence, as described above, the operator at the remote dictate station is apprised of the fact that the recording medium soon will be exhausted.

If selector switch 52 is operated to select a mode of operation whereby message recording capacity is measured and detected as a function of individual messages, the aforedescribed operation is substantially the same with the following modifications. Preset selector circuit 64 now applies a reference signal to comparator 62 representing a number of preselected messages. Also, the timing pulses produced by counter 54 are inhibited from being transmitted through AND gate 108 to counter 58. Rather, AND gate 120 now is conditioned to apply the equivalent of a timing pulse to counter 58 in response to each seizure signal applied to input terminal 130. Thus, whenever a remote dictate station is operatively connected to record/playback unit 10 for the recording of a message, a corresponding signal is counted by counter 58. When the total number of seizure signals representing the number of messages recorded on the recording medium is equal to the preselected number, comparator 62 applies an output signal to AND gate 66, as before. Hence, when the last remote station is disconnected from record/playback unit 10, as at the end of a message, AND gate 66 is conditioned to transmit the output signal from comparator 62 to AND gate 72, whereby pulse 73 is produced in the manner described above. It now should be fully appreciated that pulse 73 functions to initiate a cassette replacement operation, to reset counter 58 and to actuate pulse oscillator 84 such that a suitable indication is provided by indicator 89 representing that the preselected recording capacity has been attained.

While the present invention has been particularly shown and described with reference to a preferred embodiment thereof, it should be readily apparent that various changes and modifications in form and details may be made by one of ordinary skill in the art without departing from the spirit and scope of the invention. For example, although this apparatus has been described in connection with tape cassettes, it should be appreciated that the invention may be used with other types of recording media, such as the aforementioned examples of permanent belt records, magnetic belts, magnetic discs, and the like. Also, although a common counter 58 preferably is used to count both timing signals produced by counter 54 and seizure signals supplied by AND gate 120, thus minimizing the complexity and component parts of the illustrated apparatus, it should be appreciated that separate counters may be provided for counting the timing pulses and seizure signals, respectively. In that event, AND gate 90 may be provided to detect when the total length of messages recorded on the recording medium exceeds a predetermined amount, e.g., 29 minutes, even when the apparatus is disposed in the mode wherein recording capacity is measured and detected in terms of the number of messages that are recorded. As a further modification, if preset selector circuit 64 is not capable of providing a reference signal representing substantially zero capacity, then flip-flop circuit 68 can be omitted because circuit 64 would not be capable of being inadvertently preset to establish zero recording capacity. In yet another embodiment, the clock pulses applied to input terminal 132 need not correspond to a timing reference, such as 60Hz, 50Hz, or other line frequencies. Rather, the clock signals applied to input terminal 132 may be produced by a suitable transducer that detects incremental lengths, or portions, of the recording medium that are moved past the recording head. Hence, in such an embodiment wherein tape length, for example, is not counted with respect to time, the count exhibited by counters 54 and 58 will be related to the actual length of recording medium that has been consumed rather than a time-related representation of consumed medium.

In a still further embodiment of this invention, decoder 60 may be omitted and comparator 62 may be a conventional binary comparator. In that event, the reference signals generated by preset selector circuit 64 also will be binary signals.

Also, it should be readily appreciated that the illustrated logic circuit diagram merely is illustrative of a preferred embodiment. Various logic circuit elements may be replaced by other equivalent devices and, if desired, alternative gating arrangements may be used to produce equivalent results. As an example, conventional NAND and NOR circuitry may be substituted for the illustrated AND and OR circuitry that has been described herein. Similarly, although a binary "1" has been represented as a relatively positive potential and a binary "0" has been represented as, for example, ground potential, these representations may be reversed and, if desired, negative logic signals may be used.

Therefore, it is intended that the appended claims be interpreted as including the foregoing as well as various other similar modifications and changes.

What is claimed is:

1. In a recording system having a recorder capable of being seized to enable messages to be recorded on a recording medium of fixed length, apparatus for indicating when a preselected recording capacity of said medium has been consumed, comprising:
    adjustable means for establishing a preselected capacity of recorded messages;
    switch means for selecting said capacity to be either a predetermined number of recorder seizures or a predetermined length of recording medium;
    means for producing a signal representing that said recorder has been seized;
    means for producing signals representing the length of messages which are being recorded on said recording medium;
    counting means for counting said produced signals;
    gate means responsive to said switch means for selectively supplying either the produced signals representing that said recorder has been seized or the produced signals representing the length of messages to said counting means;
    comparing means coupled to said counting means and to said adjustable means for detecting when said count corresponds to said established preselected capacity and for generating an output signal indicative thereof; and
    utilization means coupled to said comparing means for utilizing said generated output signal in a predetermined manner.

2. The apparatus of claim 1 wherein said counting means comprises a resettable counter for counting said produced signals; and reset means to apply a reset signal to said counter for resetting the count thereof to an initial value, said reset means including means for detecting the end of a message then being recorded, and means responsive to said detected end of a message and to said output signal generated by said comparing means for producing said reset signal.

3. The apparatus of claim 2 wherein said utilization means comprises oscillating means actuated in response to said output signal generated by said comparing means to produce an oscillating signal; and indicator means responsive to said oscillating signal for providing a perceptible indication thereof.

4. The apparatus of claim 1 wherein said means for producing a signal representing the length of messages comprises timing means for producing timing signals representing successive incremental portions of said recording medium upon which said messages are recorded; and adjustable means comprises reference signal generating means for generating a reference signal corresponding to a preselected amount of recording medium having messages recorded thereon; and wherein said count exhibited by said counting means corresponds to the actual amount of recording medium having messages recorded thereon.

5. The apparatus of claim 4 wherein said timing means comprises means for generating periodic clock pulses essentially only when messages are being recorded; a resettable clock pulse counter for producing a counter output signal when a predetermined number of clock pulses are counted; and reset means responsive to said counter output signal for resetting said clock pulse counter to an initial count and for supplying an output pulse to said counting means, said output pulse representing that a message has been recorded on a predetermined amount of said recording medium.

6. The apparatus of claim 1 wherein said means for producing a signal representing that said recorder has been seized comprises means for producing a pulse signal at the commencement of recording a message; said adjustable means comprises reference signal generating means for generating a reference signal corresponding to a preselected number of messages to be recorded on said recording medium; and wherein said count exhibited by said counting means corresponds to the actual number of messages recorded on said recording medium.

7. In a central dictation system of the type having a central record/playback unit adapted to communicate individually with any one of plural remote dictate stations, said central unit being provided with a supply of recording media, means to record messages on a medium, and means to replace said medium with a fresh recording medium after a preselected recording capacity of said medium has been consumed, apparatus comprising:

timing means for generating timing pulses when messages are recorded on said recording medium, each timing pulse corresponding to an incremental length of a message;

counting means for counting said timing pulses, thereby to accumulate an indication of the total length of messages recorded on said recording medium;

presettable means for producing a reference signal representing a preselected total message length;

comparing means coupled to said counting means and to said presettable means for comparing said accumulated indication to said reference signal so as to generate an output signal when said total length of recorded messages is equal to at least said preselected length;

means for indicating when communication between said central unit and a remote dictate station terminates; and means responsive to said output signal when said communication terminates to replace said recording medium with a fresh recording medium and to reset said counting means to an initial condition.

8. The apparatus of claim 7, further comprising detecting means coupled to said counting means for detecting when the total length of messages recorded on said recording medium exceeds a predetermined amount; and means coupled to said detecting means for providing a perceptible indication that said total length of messages exceeds said predetermined amount when said remote dictate station remains in communication with said central unit.

9. The apparatus of claim 7 wherein said means responsive to said output signal includes means for preventing replacement of said recording medium with a fresh recording medium in the substantial absence of messages on said recording medium, so as to avoid operation of said output signal responsive means in the event that said presettable means is inadvertently preset to produce a reference signal representing substantially zero message length.

10. The apparatus of claim 9 wherein said preventing means comprises temporary store means responsive to said counting means for temporarily storing an indication of a minimum length of messages recorded on said recording medium; means for conditioning said output signal responsive means to respond to said output signal when said minimum length indication is stored in said temporary store means; and means for resetting said temporary store means to a quiescent condition when said recording medium is replaced with a fresh recording medium.

11. The apparatus of claim 7, wherein said means responsive to said output signal includes indicator means for providing a perceptible indication that said communication between said central unit and a remote dictate station has terminated following the recording of messages having a total length at least equal to said preselected length.

12. The apparatus of claim 7 wherein said central dictation system includes means for providing a seizure signal when communication is established between said central unit and a remote dictate station; and said apparatus further comprises a selector switch having a first state to enable said timing pulses to be supplied to said counting means and a second state to enable each seizure signal to be supplied to said counting means; and wherein said reference signal represents a preselected number of seizure signals when said selector switch is in said second state.

13. The apparatus of claim 12 wherein said timing means comprises means for supplying a reference clock signal; means for supplying a FWD signal representing that said record medium is moving in a direction to enable messages to be recorded thereon; gate means for gating said reference clock signal and said FWD signal to produce said clock signal only when said record medium is moving in the message-record enabling direction; a first counter for counting pulses included in said clock signal, said first counter having at least a first output to produce first time-related pulse having a first period and a second output to produce second time-related pulses having a second period shorter than said first period; and means responsive to each of said first pulses to produce a timing pulse.

14. The apparatus of claim 13 wherein said means responsive to each of said first pulses comprises bi-state means settable to a first state in response to a clock signal produced by said gate means and to a second state in response to a said first pulse; and an AND gate conditioned when said selector switch exhibits its first state to generate said timing pulse as said bi-state means changes to its second state.

15. The apparatus of claim 13 wherein said means to replace said recording medium comprises flip-flop means initially actuated to a first state when a fresh recording medium first replaces a previously used recording medium and actuated to a second state when a said second pulse is produced; AND gate means having a first input to receive said output signal, a second input to receive a signal representing that said flip-flop means has been actuated to its second state and a third input to receive a signal representing that communication between said central unit and said remote dictate station has terminated; and change means coupled to said AND gate means for replacing said recording medium in response to an output produced by said AND gate means.

16. The apparatus of claim 12 wherein said counting means achieves a predetermined count when a predetermined length of recording medium has messages thereon, and further comprising means for apprising the remote dictate station in communication with said central record/playback unit that said predetermined count has been reached.

\* \* \* \* \*

UNITED STATES PATENT AND TRADEMARK OFFICE
CERTIFICATE OF CORRECTION

PATENT NO. : 4,092,679

DATED : 30 May 78

INVENTOR(S) : Willy M. Sander

It is certified that error appears in the above–identified patent and that said Letters Patent are hereby corrected as shown below:

Column 16, Claim 4, line 34, change "and" to -- said --

Signed and Sealed this

Twenty-first Day of November 1978

[SEAL]

Attest:

RUTH C. MASON
*Attesting Officer*

DONALD W. BANNER
*Commissioner of Patents and Trademarks*